US009989955B2

(12) United States Patent
Porembski et al.

(10) Patent No.: US 9,989,955 B2
(45) Date of Patent: Jun. 5, 2018

(54) SYSTEM CONFIGURATION MANAGEMENT USING ENCAPSULATION AND DISCOVERY

(71) Applicants: Joseph P. Porembski, Columbus, OH (US); Daniel Galano, Miramar, FL (US)

(72) Inventors: Joseph P. Porembski, Columbus, OH (US); Daniel Galano, Miramar, FL (US)

(73) Assignee: HONDA MOTOR CO., LTD., Tokyo (JP)

( * ) Notice: Subject to any disclaimer, the term of this patent is extended or adjusted under 35 U.S.C. 154(b) by 353 days.

(21) Appl. No.: 14/795,413

(22) Filed: Jul. 9, 2015

(65) Prior Publication Data

US 2017/0010588 A1    Jan. 12, 2017

(51) Int. Cl.
| | |
|---|---|
| G05B 19/414 | (2006.01) |
| G05B 13/02 | (2006.01) |
| G05B 11/01 | (2006.01) |
| G05B 15/02 | (2006.01) |
| G06F 9/44 | (2018.01) |
| H04L 29/08 | (2006.01) |

(52) U.S. Cl.
CPC .......... *G05B 19/4148* (2013.01); *G05B 11/01* (2013.01); *G05B 13/02* (2013.01); *G05B 15/02* (2013.01); *G05B 19/414* (2013.01); *G06F 9/4411* (2013.01); *G05B 2219/1204* (2013.01); *G05B 2219/25229* (2013.01); *G05B 2219/25232* (2013.01); *G05B 2219/31418* (2013.01); *G05B 2219/33273* (2013.01); *H04L 29/08648* (2013.01)

(58) Field of Classification Search
None
See application file for complete search history.

(56) References Cited

U.S. PATENT DOCUMENTS

| | | | |
|---|---|---|---|
| 6,434,459 B2 | 8/2002 | Wong et al. | |
| 6,801,507 B1 | 10/2004 | Humpleman et al. | |
| 7,269,762 B2 | 9/2007 | Heckmann et al. | |
| 7,421,483 B1 | 9/2008 | Kalra | |
| 8,180,862 B2 | 5/2012 | Baker et al. | |
| 8,626,833 B2 | 1/2014 | Natsume | |
| 2010/0299419 A1 | 11/2010 | Ramankutty et al. | |
| 2012/0089239 A1 | 4/2012 | Sentgeorge et al. | |

*Primary Examiner* — Qing Yuan Wu
(74) *Attorney, Agent, or Firm* — Rankin, Hill & Clark LLP

(57) ABSTRACT

System configuration management using encapsulation and discovery is provided. The configuration management may include requesting, by a first electronic control unit comprising a processor, feature information associated with a second electronic control unit. The feature information may include data related to a set of features implemented by the second electronic control unit. The configuration management may also include loading, by the first electronic control unit, an internal control for a first feature of the set of features based on a determination that the first feature is not loaded on the first electronic control unit.

20 Claims, 14 Drawing Sheets

SYSTEM CONFIGURATION MANAGEMENT USING ENCAPSULATION AND DISCOVERY

BACKGROUND

In automotive electronics, an electronic control unit refers to an embedded system that controls one or more electrical systems and/or electrical subsystems of a vehicle. The number of electronic control units utilized may vary depending on the vehicle controls and/or options, with some vehicles having one hundred (or more) electronic control units.

The electronic control units used to control the operation of appliances associated with the vehicle are connected in a network configuration, such as through a common bus. This distributed communication system may be mounted in the vehicle and data and other messages may be communicated between the electronic control units.

These distributed communication systems are based on the concept that distributing features between discrete electronic control units reduces overall system complexity by having several electronic control units with a focused group of features. In the automotive environment, these systems may vary with grade and the variations may be handled by adding features to these discrete electronic control units. Traditionally, handling the variations means each discrete electronic control unit must vary with the whole system in order to be aware of the feature differences with each system variation, but this defeats the purpose of distributing the features.

BRIEF DESCRIPTION

This brief description is provided to introduce a selection of concepts in a simplified form as compared to that described below in the detailed description. This brief description is not intended to be an extensive overview of the claimed subject matter, identify key factors or essential features of the claimed subject matter, nor is it intended to be used to limit the scope of the claimed subject matter.

In one or more embodiments, system configuration management using encapsulation and discovery may be provided. For example, the system configuration management may be utilized through the implementation of object-oriented concepts of encapsulation and reflection, which are extended to embedded devices on a system level, rather than strictly in software runtime.

For example, electronic control units may implement various resources (referred to herein as "features"), which may comprise many individual functions or behaviors (referred to as "encapsulated functions"). Due to a revision, design change, update, or other reasons, a system may change, wherein one or more electronic control units implement additional (or revised) features. By performing a discovery procedure, an electronic control unit may determine the features implemented by other electronic control units. If one of the other electronic control units implements a feature that is consumed by the electronic control unit performing the discovery procedure, control(s) for the feature may be loaded on the electronic control unit performing the discovery procedure. If on the other hand, the other electronic control units do not implement the feature, the electronic control unit performing the discovery procedure does not load the control for the feature and indicates the feature is not available. In this manner, the electronic control unit selectively changes only if it is physically implementing a feature or not implementing the feature.

The following description and annexed drawings set forth certain illustrative aspects and implementations. These are indicative of but a few of the various ways in which one or more aspects may be employed. Other aspects, advantages, or novel features of the disclosure will become apparent from the following detailed description when considered in conjunction with the annexed drawings.

BRIEF DESCRIPTION OF THE DRAWINGS

Aspects of the disclosure are understood from the following detailed description when read with the accompanying drawings.

DETAILED DESCRIPTION

Figure 1:
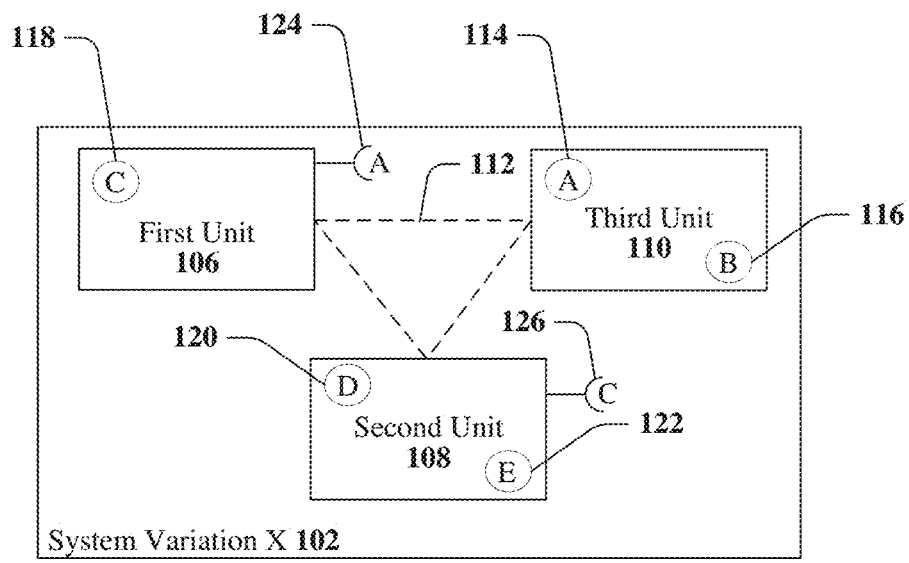
FIG. 1 illustrates an example block diagram representation of system variations.
Figure 1:
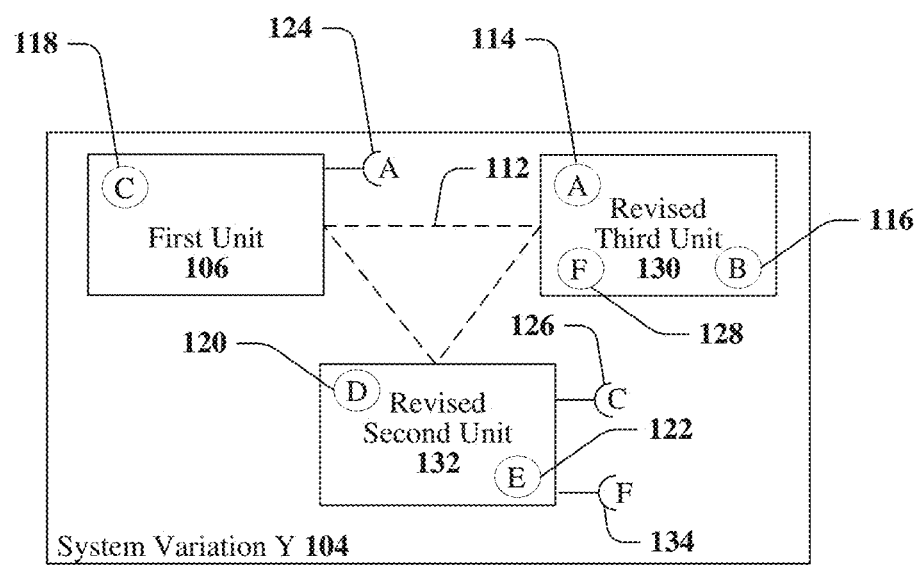

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

FIG. 1 illustrates an example block diagram representation of system variations. Illustrated are two system versions or variations, labeled as a system variation X 102 and a system variation Y 104. For example, the system variation X 102 may be an original version (or a previous version) of one or more functions and the system variation Y 104 may be an updated version (or revision) of the original (or previous) version.

In the system variation X 102 illustrated, there are three units (e.g., electronic control units), labeled as a first unit 106, a second unit 108, and a third unit 110. The units are connected by a common network 112 (or common bus) to form a distributed communication system. It is noted that three units are illustrated and described for purposes of simplicity and more than three units may be utilized according to various aspects.

Each unit may implement features, which may be the same, substantially the same, or different from the features implemented by the other units. Further, each of the features may comprise one or more individual functions or behaviors, which are referred to as "encapsulated functions." For example, as illustrated, the third unit 110 implements Feature A 114 and Feature B 116, and the first unit 106 implements Feature C 118. Further to this example, the second unit 108 implements Feature D 120 and Feature E 122.

In this example, as illustrated at 124, the first unit 106 uses (e.g., consumes) Feature A 114 implemented by the third unit 110. Further, as illustrated at 126, the second unit 108 uses Feature C 118 implemented by the first unit 106.

The system variation Y 104 includes the first unit 106 that implements feature C 118. However, in system variation Y 104, there is a new feature introduced, labeled as Feature F 128. The introduction of Feature F 128 creates a new version of the third unit, labeled as revised third unit 130. Although the second unit added no features, in the system variation Y 104, a new version of the second unit needs to be created, labeled as revised second unit 132.

The revised second unit 132 was created in order for the second unit to be aware of Feature F 128 and to be implemented to use Feature F 128, as indicated at 134. Further, since the revised second unit 132 uses Feature F 128, the unit cannot be deployed in the system variation X 102. In addition, since features A through F may encapsulate complicated behavior with many messages, simply checking a message list may prove time inefficient.

Figure 2:
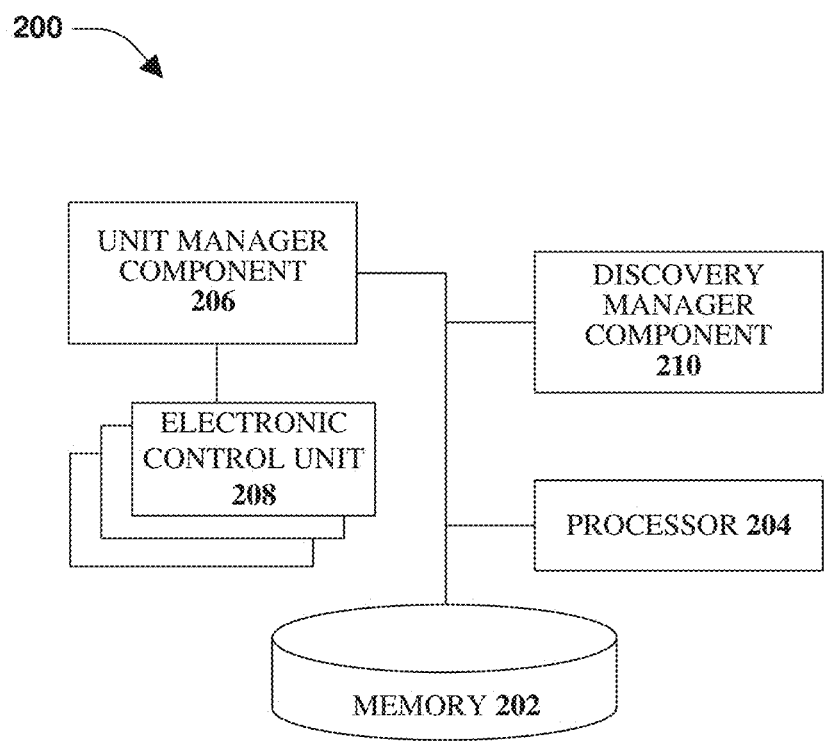
FIG. 2 illustrates an example, non-limiting embodiment of a system that performs configuration management using encapsulation and discovery, according to an aspect.

To overcome the above noted deficiencies of system versioning, FIG. 2 illustrates an example, non-limiting embodiment of a system 200 that performs configuration management using encapsulation and discovery, according to an aspect. Encapsulation is used in object-oriented programming and refers to the packing (or bundling) of data and/or functions into a single component (e.g., an electronic control unit). For example, data may be bundled with methods that operate on that data. In some implementations, encapsulation may allow properties and/or methods to be selectively hidden in an object (e.g., a single component, an electronic control unit) by creating a barrier (e.g., an impenetrable wall) that may protect associated code from access and/or corruption.

In some implementations, the system 200 may be associated with a single electronic control unit. However, according to other implementations, the system 200 may be associated with two or more electronic control units. For purposes of explanation, the system 200 of FIG. 2 will be described with reference to an implementation where the system 200 is deployed for use by a single electronic control unit.

The system 200 may include at least one memory 202 that may store computer executable components and/or computer executable instructions. The system 200 may also include at least one processor 204, communicatively coupled to the at least one memory 202. The at least one processor 204 may facilitate execution of the computer executable components and/or the computer executable instructions stored in the memory 202. The term "coupled" or variants thereof may include various communications including, but not limited to, direct communications, indirect communications, wired communications, and/or wireless communications.

It is noted that although the one or more computer executable components and/or computer executable instructions may be illustrated and described herein as components and/or as instructions separate from the memory 202 (e.g., operatively connected to the memory 202), the various aspects are not limited to this implementation. Instead, in accordance with various implementations, the one or more computer executable components and/or the one or more computer executable instructions may be stored in (or integrated within) the memory 202. Further, while various components and/or instructions have been illustrated as separate components and/or as separate instructions, in some implementations, multiple components and/or multiple instructions may be implemented as a single component or as a single instruction. Further, a single component and/or a single instruction may be implemented as multiple components and/or as multiple instructions without departing from the example embodiments.

The system 200 also includes a unit manager component 206 that may be configured to control one or more electronic control units 208, illustrated as coupled to the unit manager component 206. The electronic control units may include controls that operate alone or in conjunction with others controls to facilitate operation of a vehicle. In various examples, the electronic control units may include a powertrain control module, a transmission control module, a brake control module, a central control module, a central timing module, a general electronic module, a body control module, a suspension control module, a telematics module, an audio manager module, an audio processing module, an audio tuning module, a vehicle processing module, a driver remote module, and/or other modules.

For example, the telematics module of an electronic control unit may provide one or more navigation instructions or anticipated navigation instructions to a system component and/or an occupant of a vehicle, according to one or more aspects. In another example, a driver remote module of an electronic control unit may provide one or more operation instructions or anticipated operation instructions to a system component and/or an occupant of the vehicle. As used herein, an occupant of the vehicle may include a driver of the vehicle, an operator of the vehicle, an individual, an entity, a person, a passenger, and so on. Further, as used herein, an operator of a vehicle may be a driver of a vehicle or an occupant who provides one or more vehicle operations or commands to the vehicle, such as steering commands, for example.

In one or more embodiments, an electronic control unit (or multiple electronic control units) of the one or more electronic control units 208 may receive one or more operator responses, one or more operator reactions, one or more operations, such as vehicle operations (e.g., steering, horn, turn signal, and so on) or maneuvers made by an operator of a vehicle. In other words, the electronic control unit or multiple electronic control units (or one or more subunits thereof) may receive information or data, such as data related to operator behavior, maneuvers or operator responses provided by the operator of the vehicle (e.g., braking, accelerating, steering, honking, shifting, activation of a turn signal, adjusting vehicle trajectory, and so forth).

The unit manager component 206 may be configured to associate one or more features (or functions) with each unit of the one or more electronic control units 208 and encapsulate the features (or functions) with reference to one or more identifiers, which may be predefined identifiers.

For example, a steering feature, or set of steering features, may be identified as belonging to feature class "A," and an acceleration feature or set of acceleration features may be identified as belonging to feature class "B." Although discussed with respect to feature classes identified with alphabetic identifiers (e.g., A, B, C, D, and so on), the disclosed aspects are not so limited. Instead, any type of indicator may be utilized to identify a particular feature class and to allow the control units to identify the feature class under consideration and available for consumption. Examples of such indicators include alphabetic identifiers, numeric identifiers, alphanumeric identifiers, a character string identifier, a word identifier, a symbol identifier, and so on.

The unit manager component 206 may be configured to communicate the indicator(s) and the feature class(es) to each control unit of the one or more electronic control units 208. Such communication may be based upon a set of data transmitted to each control unit, a look-up table, or other database accessible by the control units, access to the memory 202, or through other communication means. The term "set," "subset," or the like as employed herein excludes the empty set (e.g., the set with no elements therein). Thus, a "set," "subset," or the like includes one or more data, one or more controls, one or more functions, and so on.

Also included in the system 200 is a discovery manager component 210 that may be configured to interact with other control units and determine the features associated with the other control units. For example, upon start-up (or at a different time), the unit manager component 206 may be configured to deploy the control unit(s) in the case of their maximum dependency. Further to this example, the discovery manager component 210 may be configured to cause the control units to interact and determine which features are implemented by each of the other control units. Deploying the control units in the case of their maximum dependency may include allowing each control unit to search for features associated with capabilities of the particular control unit, regardless of whether the feature is implemented in a particular system or on a particular vehicle.

In a specific example, a feature is implemented by one of the other control units and is consumed by the control unit performing the discovery procedure (e.g., discovering control unit). However, the discovering control unit does not have controls for that feature loaded and/or enabled. In this case, the control(s), such as a driver(s), may be loaded on the discovering control unit.

In another specific example, a feature is not implemented by one of the other control units, but is consumed by (and controls are loaded on) the discovering control unit. In this case, the control(s) may be unloaded from or disabled on the discovering control unit. Further, the discovering control unit is able to determine the feature is not available.

Figure 3:
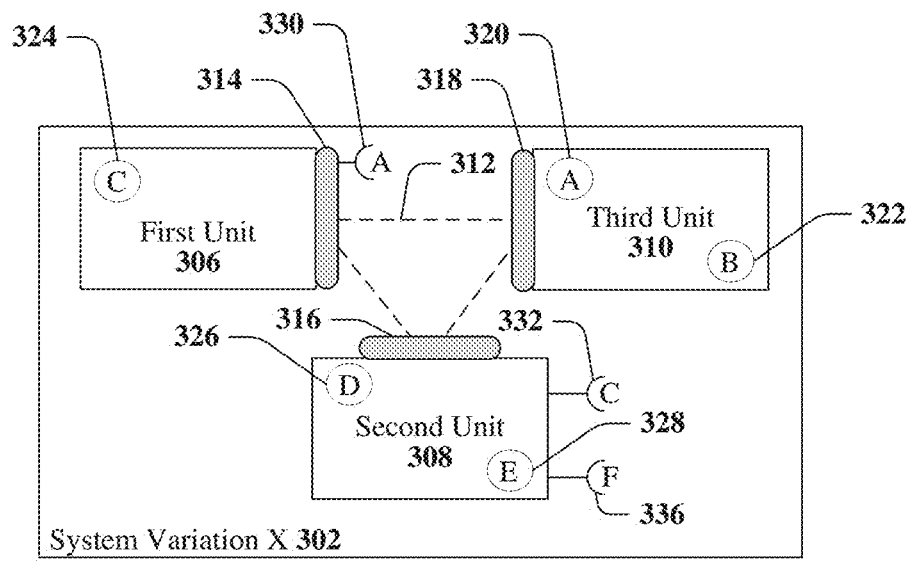
FIG. 3 illustrates an example, non-limiting block diagram of a representation implementation of system variations with discovery, according to an aspect.
Figure 3:
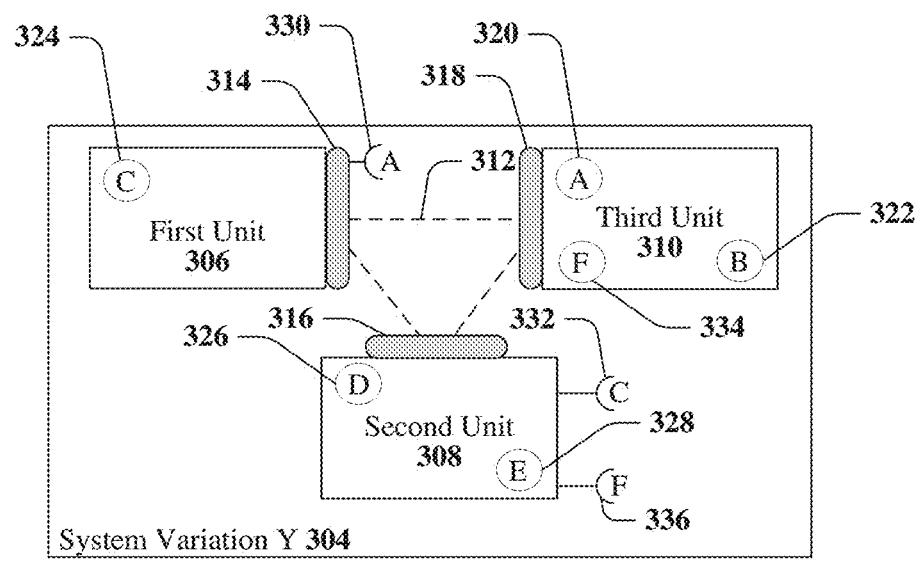

FIG. 3 illustrates an example, non-limiting block diagram of a representation implementation of system variations with discovery, according to an aspect. Included are a system variation X 302 and a system variation Y 304. Similar to the implementations illustrated in FIG. 1, the first system variation X 302 includes a first unit 306, a second unit 308, and a third unit 310, which are connected by a common network 312. It is noted that although three electronic control units are illustrated and described, the disclosed aspects are not limited to three electronic control units and fewer, or more, electronic control units may be implemented according to various aspects.

The first unit 306 implements a first discovery function 314, the second unit 308 implements a second discovery function 316, and the third unit 310 implements a third discovery function 318. As used herein, the discovery functions may also be referred to as discovery features. The respective discovery function allows the associated unit to determine the features implemented by each of the other units in order for the features to be selectively loaded and/or unloaded from the unit performing the discovery process.

For example, the second discovery function 316 may be configured to transmit a request to the first discovery function 314. The second discovery function 316 may also be configured to send another request the third discovery function 318. The requests may be sent to determine which feature(s) are implemented by the first control unit 306 and the third control unit 310, respectively. In a similar manner, the first discovery function 316 and/or the third discovery function 318 may be configured to transmit requests to the other units to determine which features are implemented by the other units.

Further, similar to FIG. 1, the third unit 310 implements a first feature (e.g., Feature A 320) and a second feature (e.g., Feature B 322). The first unit 306 implements a third feature (e.g., Feature C 324) and the second unit 308 implements a fourth feature (e.g., Feature D 326) and a fifth feature (e.g., Feature E 328).

In the system variation X 302 and the system variation Y 304, the first unit 306 consumes Feature A 320 implemented by the third unit 310, as indicated at 330. The second unit 308 consumes the Feature C 324 implemented by the first unit 306, as indicated at 332. Further, in the system variation Y 304, a sixth feature (e.g., a new feature) is deployed, illustrated as Feature F 334.

Since the units implement respective discovery functions (e.g., the first discovery function 314, the second discovery function 316, and the third discovery function 318), the units may change if the respective unit is physically implementing a feature. The respective discovery functions may be implemented during startup or at a different time.

Further, during a discovery process the units may be deployed in the case of their maximum dependency. For example, the second unit 308, in the case of its maximum dependency, consumes feature F 334, as indicated at 336. Therefore, at about the same time as a discovery process is implemented by the second discovery function 316, the second unit 308 may determine that Feature F 334 is available. Accordingly, at least one control associated with Feature F 334 may be loaded for consumption by the second unit 308, in the case of the system variation Y 304.

However, in the system variation X 302, although the second unit 308 consumes Feature F 334, as indicated at 336, Feature F 334 is not available. Therefore, at about the same time as the discovery process is implemented by the second discovery function 316, it may be determined that the feature is not available.

For example, as discussed with reference also to FIG. 2, in an illustrative example, the discovery manager component 210 (or the second discovery function 316) may be configured to cause the second unit 308 to interact with the third unit 310. Such interaction may include transmitting a request to the third unit 310 requesting information related to the encapsulated features implemented by the third unit 310. The third unit 310 may respond to the request and provide an indication of the encapsulated features that are available for consumption by the second unit 308. In a similar manner, the discovery manager component 210 (or the second discovery function 316) may be configured to cause the second unit 308 to interact with the first unit 306 and/or other units.

The interaction allows the second unit 308 to determine which features are implemented by the third unit 310. If the third unit 310 implements Feature F 334 (such as in the system variation Y 304 of FIG. 3), the second unit 308 loads its internal control for Feature F 334.

If however, the third unit 310 does not implement Feature F 334 (such as in the system variation X 302 of FIG. 3), the second unit 308 does not load the control for Feature F 334. For example, the second unit 308 may bypass a load of one or more controls associated with Feature F 334. In another example, if the second unit 308 has already loaded the one or more controls associated with Feature F 334, upon determining Feature F 334 is not available, the one or more controls may be unloaded from the second unit 308. In this case, the second unit 308 understands Feature F 334 is not available.

In such a manner, the second unit 308 may be the same between the system variation X 302 and the system variation Y 304. For example, the second unit 308 in the system variation X 302 consumes feature F 334, as indicated at 336. However, since the third unit 310 in the system variation X 302 does not implement Feature F, the feature is not available and the second unit 308 is deployed without consuming Feature X 334. The implementation of the same, or substantially the same, control unit across system variations may reduce implementation costs and provide other implementation efficiencies (e.g., reduced implementation time, less overhead costs, and so on).

Figure 4:
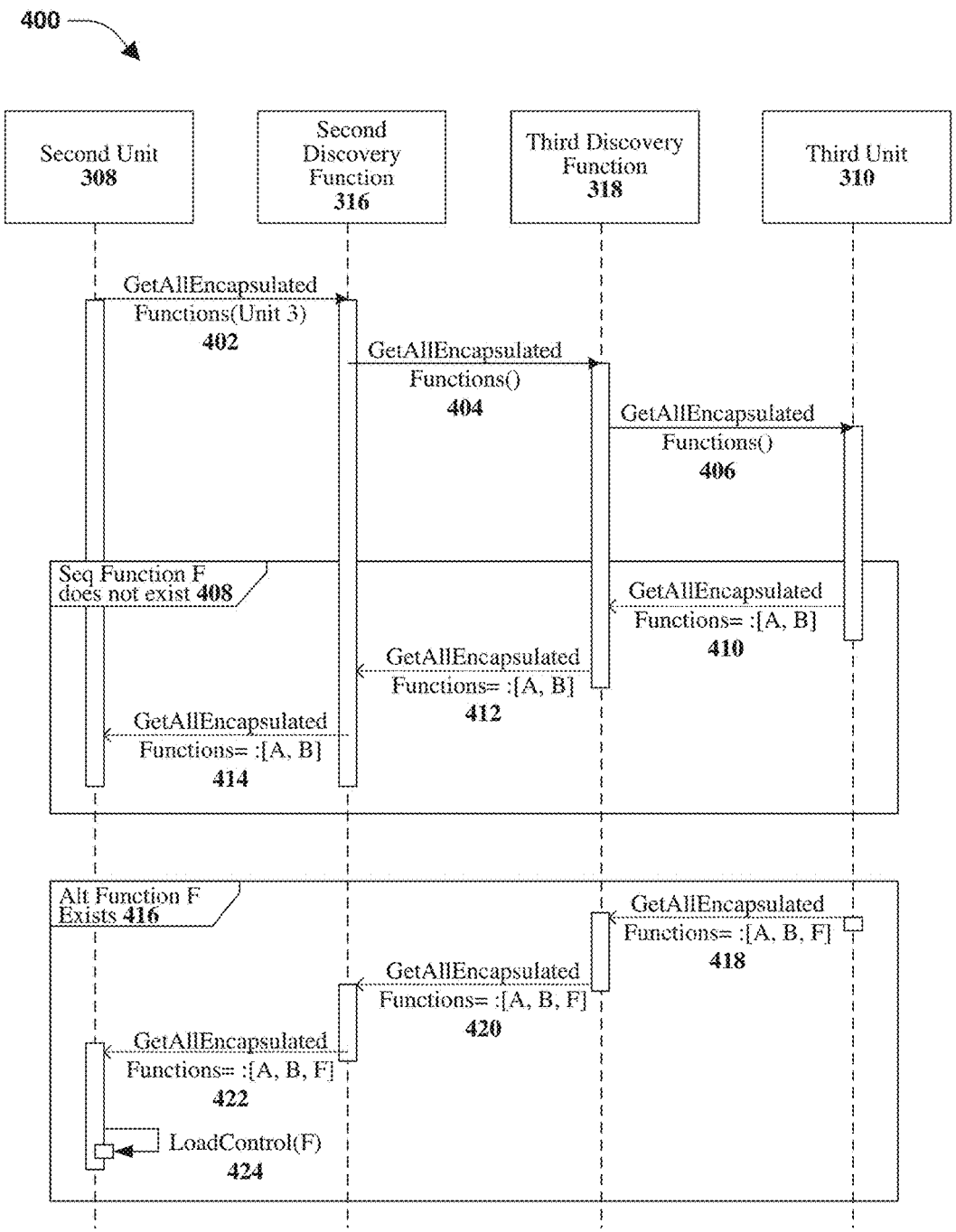
FIG. 4 illustrates an example, non-limiting flow diagram of discovery behavior, according to an aspect.

FIG. 4 illustrates an example, non-limiting flow diagram 400 of discovery behavior, according to an aspect. The flow diagram 400 will be discussed with reference to the second unit 308, the second discovery function 316, the third discovery function 318, and the third unit 310. However, it should be understood that similar discovery behavior might be implemented by other electronic control units, according to various implementations.

As a portion of a discovery procedure, the second unit 308 may request information from the second discovery function 316 related to the encapsulated functions that are implemented by the third unit 310 ("GetAllEncapsulatedFunctions(Unit 3)" 402). The second discovery function 316 may transmit the request ("GetAllEncapsulatedFunctions( ) 404) to the third discovery function 318. The third discovery function 318 may determine the features implemented by the third unit 310 by requesting the information from the third unit 310 ("GetAllEncapsulatedFunctions( ) 406).

In the situation where Function F 334 does not exist 408, the third unit 310 may respond to the request and may indicate it implements Feature A 320 and Feature B 322 ("GetAllEncapsulatedFunctions=:[A,B]" 410). The third discovery function 318 may convey the information to the second discovery function 316 ("GetAllEncapsulatedFunctions=:[A,B]" 412). The information may be conveyed to the second unit 308 from the second discovery function 316 ("GetAllEncapsulatedFunctions=[A,B]" 414). Although the second unit 308 may consume Feature F 334, as indicated at 336 (of FIG. 3), based on the results of the discovery procedure, the second unit 308 is aware that the third unit 310 implements Feature A 320 and Feature B 322, but does not implement Feature F 334. Therefore, the second unit 308 may load one or more controls for Feature A 320 and Feature B 322 (if not previously loaded) in order to consume Feature A 320 and Feature B 322. In addition, the second unit 308 operates without consuming Feature F 334, since Feature F 334 is not available.

In the situation where the alternative Function F 334 does exist 416, the third unit 310 may respond to the request send from the third discovery function 318 (e.g., "GetAllEncapsulatedFunctions( )" 406), by indicating it implements Feature A 320, Feature B 322, and Feature F 334 ("GetAllEncapsulatedFunctions=:[A,B,F]" 418). The third discovery function 318 may convey the information to the second discovery function 316 ("GetAllEncapsulatedFunctions=:[A,B,F]" 420). The information may be conveyed by the second discovery function 316 to the second unit 308 ("GetAllEncapsulatedFunctions=:[A,B,F]" 422). The second discovery unit 308 may load one or more controls for Feature A 320, Feature B 322, and/or Feature F 334, if such controls have not previously been loaded. In the example of FIG. 4, the second unit 308 already has the controls for Feature A 320 and Feature B 322 loaded. Therefore, at 424, a control for Feature F is loaded ("LoadControl(F)").

Figure 5:
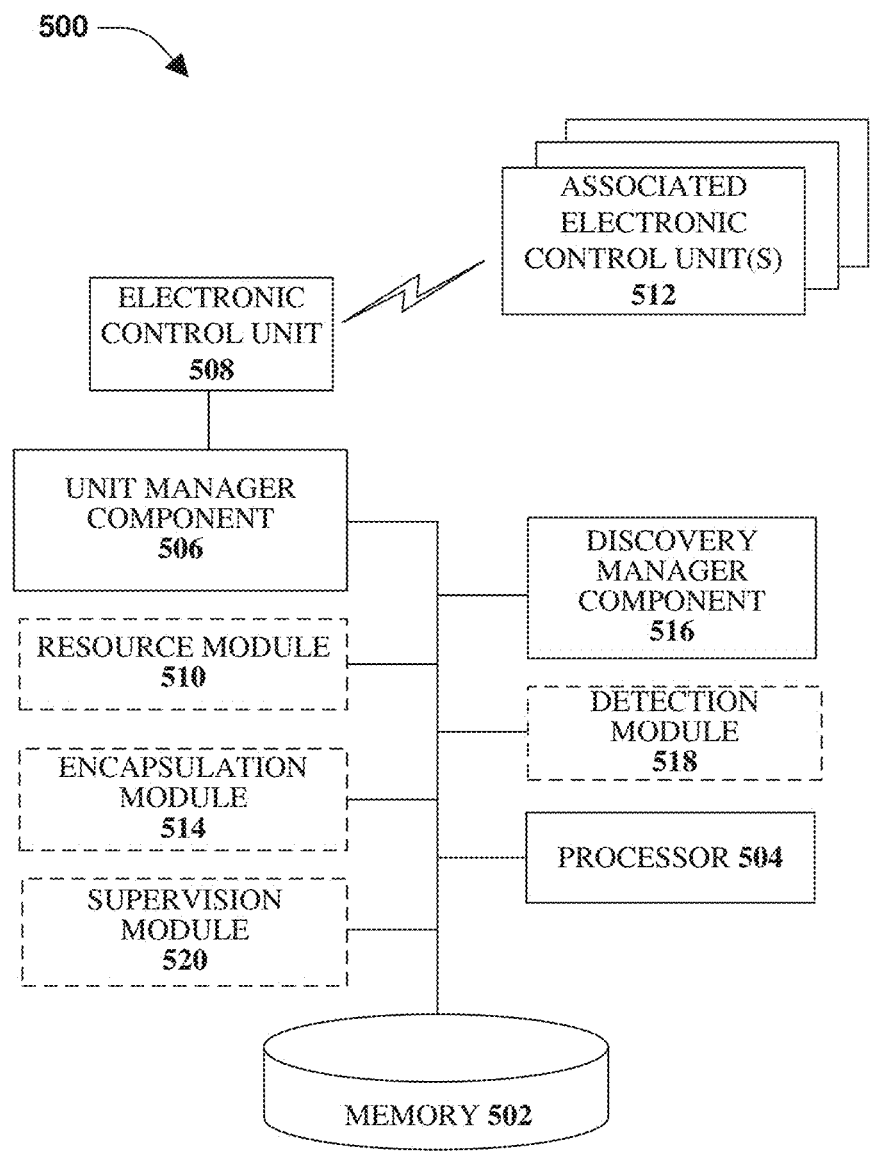
FIG. 5 illustrates an example, non-limiting implementation of a system that utilizes a discovery procedure to selectively load controls for available features, according to an aspect.

FIG. 5 illustrates an example, non-limiting implementation of a system 500 that utilizes a discovery procedure to selectively load controls for available features, according to an aspect. In some implementations, the system 500 may be associated with a single electronic control unit. However, according to other implementations, the system 500 may be associated with two or more electronic control units. For purposes of explanation, the system 500 of FIG. 5 will be described with reference to an implementation where the system 500 is deployed for use by a single electronic control unit.

The system 500 may include at least one memory 502 that may store computer executable components and/or computer executable instructions. The system 500 may also include at least one processor 504, communicatively coupled to the at least one memory 502. The at least one processor 504 may facilitate execution of the computer executable components and/or the computer executable instructions stored in the memory 502.

The system 500 may also include a unit manager component 506 that may be configured to control one or more features of an electronic control unit 508. Also included in the system 500 may be a resource module 510 that may be configured to determine information related to the features implemented by one or more associated electronic control unit(s) 512. The association between the electronic control unit 508 and one or more associated electronic control unit(s) 512 includes control units that are operatively coupled. For example, the electronic control unit 508 and one or more associated electronic control unit(s) 512 may be connected, such as through a common bus, within a distributed communication system. For example, the electronic control unit 508 and one or more associated electronic control unit(s) may be implemented on a particular vehicle and/or connected in a network configuration (which may be wired, wireless, or a combination thereof).

In accordance with some implementations, the unit manager component 506 and/or the resource module 510 may be configured to associate a defined identifier with each feature implemented by the electronic control unit 508 and one or more associated electronic control unit(s) 512. For example, the defined identifier may be an identifier that is predefined, such as when a feature is created, when a feature is modified, or at a different time. Further, the defined identifier may be unique for each feature.

For example, a transmission control feature may be associated with the identifier "txctrl_1," a suspension control feature may be associated with the identifier "spsnctrl_3," and a vehicle processing feature may be associated with the identifier "vhlprc_4." Such identifiers may be retained in a database (not shown), where the unit manager component 506 and/or the resource module 510 may be associated with the database.

For example, the database may be a data store, a memory (such as the memory 502), or another storage media. Further, the database may be integrated with (e.g., embedded on) the unit manager component 506 and/or the resource module 510. In another example, the database (data store, memory, or other storage media) may be operatively coupled to the unit manager component 506 and/or the resource module 510.

In some implementations, the memory 502 may be utilized by the unit manager component 506 and/or the resource module 510 to retain the information related to the features implemented by the one or more associated electronic control unit(s) 512. For example, after completion of a discovery procedure, the feature information or feature data received may be retained. Such information or data may be retained as a mapping that indicates the features implemented by each of the electronic control units.

The system 500 may also include an encapsulation module 514 that may be configured to encapsulate the features. In other words, the encapsulation module 514 may be configured to bundle data with the methods that operate on that data. In some implementations, the encapsulation module 514 may be configured to selectively hide properties and/or methods within an object (e.g., within the electronic control unit 508).

Also included in the system 500 is a discovery manager component 516 that may be configured to interact with the electronic control unit 508 and one or more associated electronic control unit(s) 512. Such interaction may include a discovery procedure during which various resources or features implemented by the electronic control units (as well as other information) is communicated between the electronic control units. The interaction may occur during a start-up procedure, when a change is detected, or based on other criteria (e.g., at defined intervals, periodically, randomly, and so on).

A detection module 518 may be configured to convey a message or multiple messages to one or more associated electronic control unit(s) 512 (or their respective discovery functions). The message (or multiple messages) may be a request for feature information to determine the features that are implemented by each of the one or more associated electronic control unit(s) 512. For example, the message(s) may be transmitted as a unicast transmission(s), a broadcast transmission(s), a multicast transmission(s), or another type of transmission.

Each of the one or more associated electronic control unit(s) 512 may respond with respective information related to the resources or features implemented by the responding electronic control unit. Such features may be indicated based on the defined identifiers. For example, each control unit of the one or more associated electronic control unit(s) 512 may provide feature information for all features it implements, regardless of whether the feature is consumed by the electronic control unit 508.

Based on the response(s) received from the one or more associated electronic control unit(s) 512, the discovery manager component 516 may determine whether a particular feature is available for consumption by the electronic control unit 508. For example, if a control unit of the one or more associated electronic control unit(s) 512 indicates it implements a particular feature, a determination is made (e.g., by the resource module 510) whether the electronic control unit 508 consumes the feature. If the feature is consumed by the electronic control unit 508, a determination is made (e.g., by a supervision module 520) whether a control (or a set of controls) for that feature are loaded on the electronic control unit 508. If the control (or set of controls) is not loaded, the supervision module 520 may be configured to load the control (or set of controls) on the electronic control unit 508 in order for the electronic control unit 508 to consume the available feature.

If an electronic control unit of the one or more associated electronic control unit(s) 512 does not indicate it implements a particular feature, the supervision module 520 does not load a control (or set of controls) for the missing feature on the electronic control unit 508. According to another implementation, the supervision module 520 unloads one or more controls from the electronic control unit 508 if an associated electronic control unit does not indicate it implements a particular feature. In such a manner, the electronic control unit 508 may respond to whether a feature is available for consumption and loads and/or unloads the controls according to what is determined based on the responses received from the one or more associated electronic control unit(s) 512. Accordingly, the electronic control unit 508 may be the same unit regardless of the features implemented by the one or more associated electronic control units(s) 512 (e.g., regardless of the system version).

Automated learning may be employed to facilitate one or more of the disclosed aspects. For example, a machine learning and reasoning component (not shown) may be utilized to automate one or more of the disclosed aspects. The machine learning and reasoning component may employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component may employ principles of probabilistic and decision theoretic inference. Additionally or alternatively, the machine learning and reasoning component may rely on predictive models constructed using machine learning and/or automated learning procedures. Logic-centric inference may also be employed separately or in conjunction with probabilistic methods.

The machine learning and reasoning component may infer whether a discovery procedure should be implemented, whether one or more controls should be loaded based on an indication that a feature is available for consumption, and so on. Such inferences may be made by obtaining knowledge about the possible actions and knowledge about system initiation, changes to one or more electronic control units, what is to be accomplished based on applications or programs being implemented by various electronic control units, the application/program context, or combinations thereof. Based on this knowledge, the machine learning and reasoning component may make an inference based on which actions to implement, which electronic control units to query, which controls to load, which controls to unload or deactivate, or combinations thereof.

As used herein, the term "inference" refers generally to the process of reasoning about or inferring states of the system, a component, a module, the environment, and/or one or more electronic control units from a set of observations as captured through events, reports, data and/or through other forms of communication. Inference may be employed to identify a specific context or action, or may generate a probability distribution over states, for example. The inference may be probabilistic. For example, computation of a probability distribution over states of interest based on a consideration of data and/or events. The inference may also refer to techniques employed for composing higher-level events from a set of events and/or data. Such inference results in the construction of new events and/or actions from a set of observed events and/or stored event data, whether or not the events are correlated in close temporal proximity, and whether the events and/or data come from one or several event and/or data sources. Various classification schemes and/or systems (e.g., support vector machines, neural networks, logic-centric production systems, Bayesian belief networks, fuzzy logic, data fusion engines, and so on) may be employed in connection with performing automatic and/or inferred action in connection with the disclosed aspects.

The various aspects (e.g., in connection with automatically determining the features available for consumption, determining one or more controls to load and/or unload, and so forth) may employ various artificial intelligence-based schemes for carrying out various aspects thereof. For example, a process for determining if a discovery procedure should be implemented and analyzing results obtained based on implementation of the discovery procedure may be enabled through an automatic classifier system and process.

A classifier is a function that maps an input attribute vector, x=(x1, x2, x3, x4, xn), to a confidence that the input belongs to a class. In other words, f(x)=confidence(class). Such classification may employ a probabilistic and/or statistical-based analysis (e.g., factoring into the analysis utilities and costs) to prognose or infer an action that should be employed to load and/or unload controls to enable an electronic control unit to consume available features. In the case of features, for example, attributes may be identification of the features implemented by associated electronic control units and the classes are criteria related to the features that are consumed by the electronic control unit of interest.

A support vector machine (SVM) is an example of a classifier that may be employed. The SVM operates by finding a hypersurface in the space of possible inputs, which hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein may be inclusive of statistical regression that is utilized to develop models of priority.

One or more aspects may employ classifiers that are explicitly trained (e.g., through a generic training data) as well as classifiers that are implicitly trained (e.g., by observing changes or updates to one or more electronic control units, by receiving extrinsic information, and so on). For example, SVM's may be configured through a learning or training phase within a classifier constructor and feature selection module. Thus, a classifier(s) may be used to automatically learn and perform a number of functions, including but not limited to determining according to a predetermined criteria when to implement a discovery action or procedure, which electronic control units to query, which features are of interest, and so forth. The criteria may include, but is not limited to, similar requests, historical information, and so forth.

Additionally or alternatively, an implementation scheme (e.g., a rule, a policy, and so on) may be applied to control and/or regulate discovery requests, loading of one or more controls, unloading of one or more controls, and so forth. In some implementations, based upon a predefined criterion, the rules-based implementation may automatically and/or dynamically interpret feature information and automatically load and/or unload one or more controls. In response thereto, the rule-based implementation may automatically interpret and carry out functions associated with the discovery procedure by employing a predefined and/or programmed rule(s) based upon any desired criteria.

Figure 6:
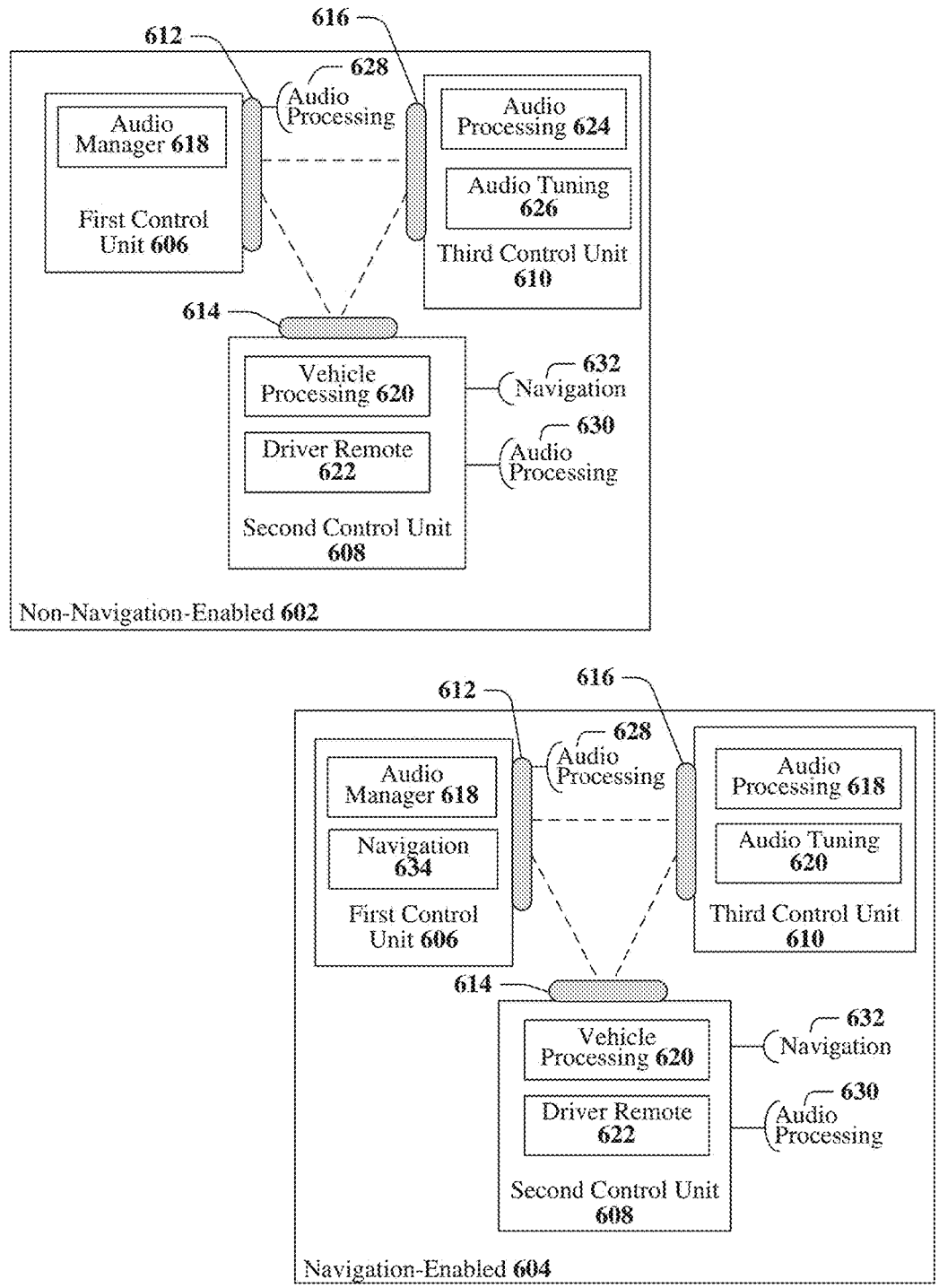
FIG. 6 illustrates an example, non-limiting representation of block diagrams representing system versioning, according to an aspect.

FIG. 6 illustrates an example, non-limiting representation of block diagrams representing system versioning, according to an aspect. Although FIG. 6 is illustrated and discussed with respect to navigation-enabled and non-navigation-enabled features (or appliances), the disclosed aspects are not limited to this implementation.

A non-navigation-enabled variation 602 and a navigation-enabled variation 604 are illustrated. Included are a first control unit 606, a second control unit 608, and a third control unit 610. It is noted that although three electronic control units are illustrated and described, the disclosed aspects are not limited to three electronic control units and fewer or more electronic control units may be implemented according to various aspects.

The first control unit 606 includes a first discovery function 612, the second control unit 608 includes a second discovery function 614, and the third control unit 610 includes a third discovery function 616. The respective discovery functions may be configured to perform various discovery processes, including the discovery process related to determining the encapsulated functions implemented by electronic control units as discussed herein.

In this example, the first control unit 606 implements an audio manager feature 618. The second control unit 608 implements a vehicle processing feature 620 and a driver remote feature 622. Further, the third control unit 610 implements an audio processing feature 624 and an audio tuning feature 626. As indicated at 628 and 630, the first control unit 606 and the second control unit 608 consume the audio processing feature 624 implemented by the third control unit 610.

Further, the second control unit 608, as indicated at 632, consumes a navigation feature 634, which is implemented by the first control unit 606 in the navigation-enabled variation 604, but not in the non-navigation-enable variation 602. For example, the second control unit 608 may consume the navigation feature 634 in order to display navigation related information.

Thus, in the navigation-enabled variation 604, the second control unit 608 determines (e.g., based on a discovery procedure implemented by the second discovery function 614) that the navigation feature 634 is available, based on a response received from the first control unit 606. Therefore, at least one control used for the navigation feature 634 may be loaded on the second control unit 608.

Figure 7:
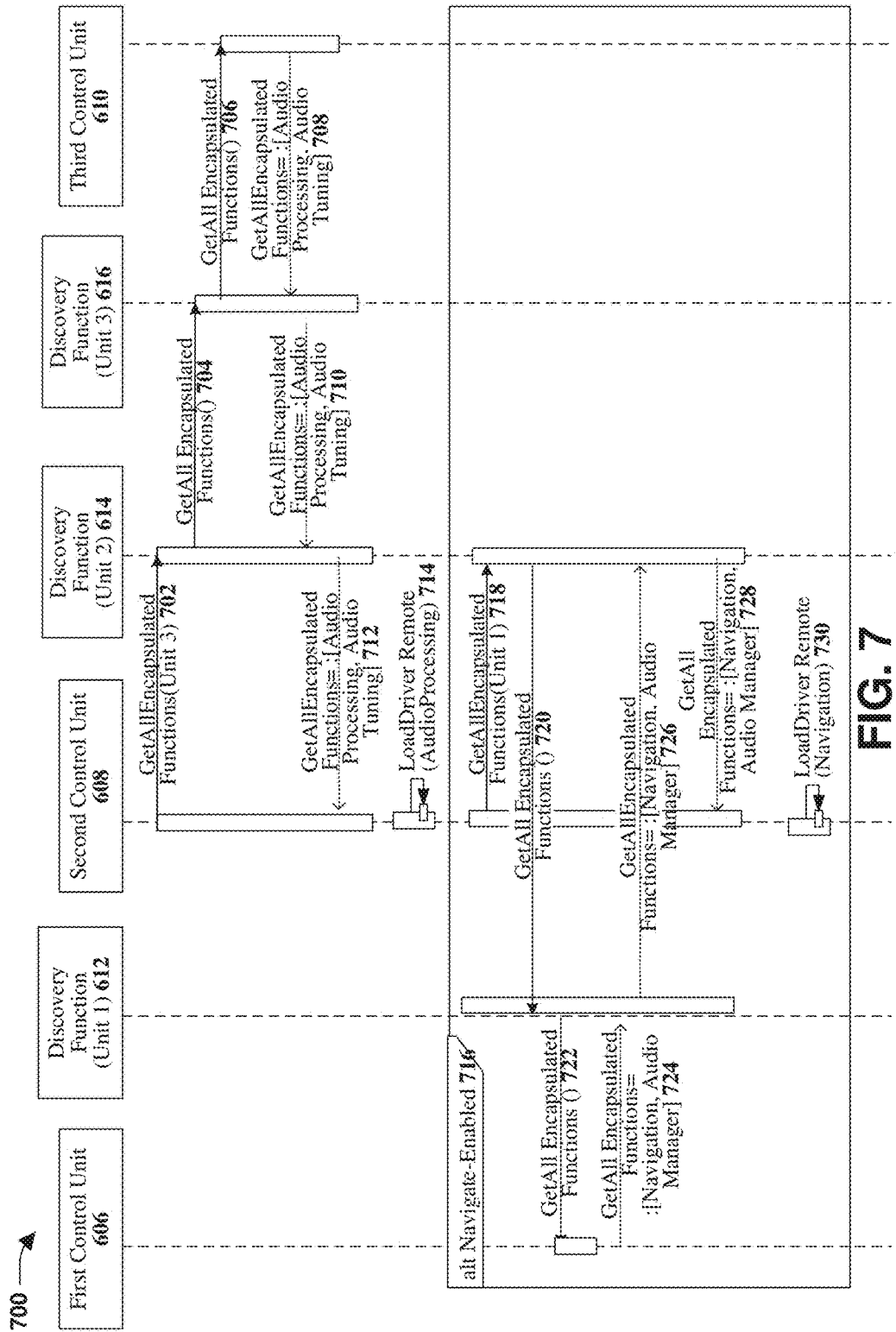
FIG. 7 illustrates an example flow diagram of a representative implementation of a specific discovery procedure for determining navigation-enabled features, according to an aspect.

FIG. 7 illustrates an example flow diagram 700 of a representative implementation of a specific discovery procedure for determining navigation-enabled features, according to an aspect. As mentioned with respect to FIG. 6, although the specific example provided relates to a navigation feature, the disclosed aspects are not limited to a navigation feature and other features, implemented by various electronic control units, may be utilized with the one or more disclosed aspects.

With reference also to FIG. 6, illustrated are the first control unit 606, the first discovery function 612, the second control unit 608, the second discovery function 614, the third discovery function 616, and the third control unit 610. At about the same time as system start up, or at a different time, such as when a change is detected, or based on other criteria (e.g., at defined intervals, periodically, randomly, and so on) it may be determined that a discovery procedure should be initiated. The discovery procedure may be utilized to ascertain the features implemented by various electronic control units and available for consumption by the electronic control unit performing the discovery procedure, which is the second control unit 608 in this example.

Therefore, in this example, the second control unit 608 informs the second discovery function 614 to determine the encapsulated functions implemented by the third control unit 610 ("GetAllEncapsulatedFunctions(Unit 3)" 702). The second discovery function 614 conveys a message to the third discovery function 616 in order to request a list of the features implemented by the third control unit 610 ("GetAllEncapsulatedFunctions(s)" 704). The third discovery function 616 conveys the message to the third control unit 610 ("GetAllEncapsulatedFunction(s)" 706).

The third control unit 610 responds with information related to the features it implements. In this example, the features implemented by the third control unit 610 are the audio processing feature 624 and the audio tuning feature 626 ("GetAllEncapsulatedFunctions=:[Audio Processing, Audio Tuning]" 708). The third discovery unit 616 conveys the information to the second discovery unit 614 ("GetAllEncapsulatedFunctions=:[Audio Processing, Audio Tuning]" 710). The second control unit 608 receives, from the second discovery function 614, the information related to the features implemented by the third control unit 610 ("GetAllEncapsulatedFunctions=:[Audio Processing, Audio Tuning]" 712).

Since the second control unit 608 consumes the audio processing feature, as indicated at 630 of FIG. 6, one or more controls for the audio processing features may be loaded in the second control unit 608 (if not currently loaded on the second control unit 608). For example, the second control unit 608 may be configured to load a remote driver (or multiple remote drivers) for the audio processing feature ("LoadDriverRemote(Audio Processing)" 714).

In implementations where the system is navigation-enabled 716, the second control unit 608 notifies the second discovery unit 614 to determine the features implemented by the first control unit 606 ("GetAllEncapsulatedFunctions (Unit1)" 718). The request is transmitted from the second discovery function 614 to the first discovery function 612 ("GetAllEncapsulatedFunctions( )" 720). The first discovery unit 612 requests the function information from the first control unit 606 ("GetAllEncapsulatedFunctions( ) 722).

The first control unit 606 may respond with the feature information for the features it implements. In this case, the features implemented by the first control unit 606 are the navigation feature 634 and the audio manager feature 618 ("GetAllEncapsulatedFunctions=:[Navigation, Audio Manager]" 724). This information is sent from the first discovery function 612 to the second discovery function 614 ("GetAllEncapsulatedFunctions=:[Navigation, Audio Manager]" 726).

The second discovery function 614 notifies the second control unit 608 that the navigation feature 634 and the audio manager feature 618 are available ("GetAllEncapsulatedFunctions=:[Navigation, Audio Manager]" 728). Since the second control unit 608 consumes the navigation feature 634, but not the audio manager feature 618, the second control unit 608 loads one or more controls for the navigation feature 624. For example, the second control unit 608 may load a remote driver (or multiple drivers) for the navigation function ("LoadDriverRemote(Navigation)" 730).

Figure 8:
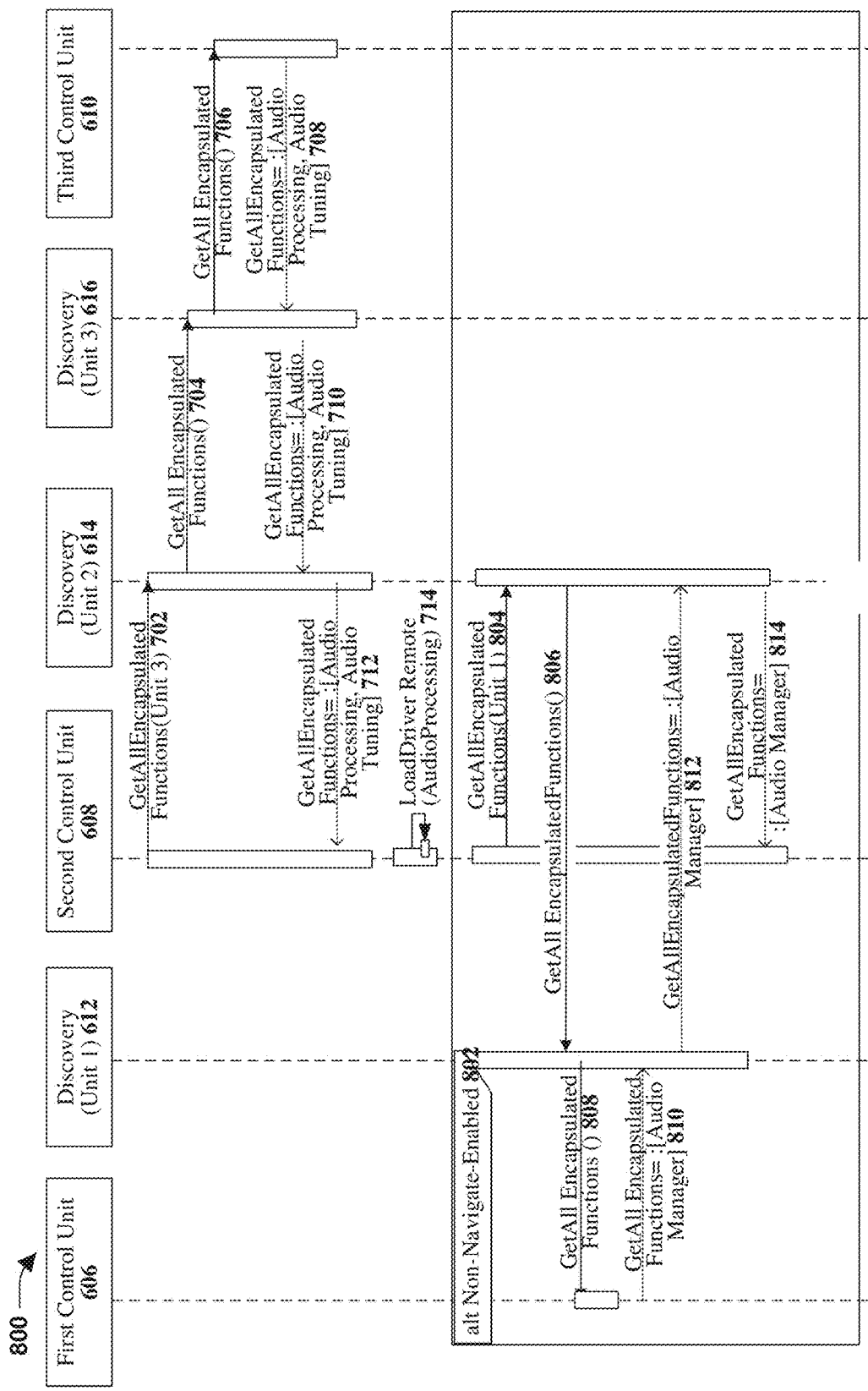
FIG. 8 illustrates an example flow diagram of an implementation of discovery for recognizing non-navigation-enabled features, according to an aspect.

FIG. 8 illustrates an example flow diagram 800 of an implementation of discovery for recognizing non-navigation-enabled features, according to an aspect. Similar to FIG. 7, the second control unit 608 requests information related to the encapsulated features of the third control unit 614 and, therefore, these actions (labeled 702-714) will not be repeated for FIG. 8 for purposes of simplicity.

In implementations where the system is non-navigation-enabled 802, the second control unit 608 notifies its second discovery unit 614 to determine the features implemented by the first control unit 606 ("GetAllEncapsulatedFunctions (Unit1)" 804). The request is transmitted from the second discovery function 614 to the first discovery function 612 ("GetAllEncapsulatedFunctions( ) 806). The first discovery function 612 requests the function information from the first control unit 606 ("GetAllEncapsulatedFunctions( ) 808).

The first control unit 606 responds with the feature information for the features it implements. In this case, the feature implemented by the first control unit 606 is the audio manager feature 618 ("GetAllEncapsulatedFunctions=:[Audio Manager]" 810). This information is sent from the first discovery function 612 to the second discovery function 614 ("GetAllEncapsulatedFunctions=:[Audio Manager]" 812). The second discovery function 614 notifies the second control unit 608 that the audio manager function 618 is available ("GetAllEncapsulatedFunctions=:[Audio Manager]" 814). If the one or more controls for the audio manager function 618 are not loaded on the second control unit 608, such controls may be loaded at about the same time as the discovery process is completed, during the discovery process, or after completion of the discovery process.

Thus, in the examples of FIG. 7 and FIG. 8, the second control unit 608 may respond to whether or not a navigation feature is available. If available, the second control unit 608 may load the control(s) for the navigation feature as necessary. In an implementation, the loading of the one or more controls (e.g., one or more drivers) may be performed at about the same time as the system is initialized (e.g., once the system is running) or at a different timer. Therefore, the second control unit 608 may be the same unit in both the navigation-enabled system version (FIG. 7) and non-navigation-enabled system version (FIG. 8).

In these types of systems, subsequent revisions of features or versions of features may be extensions of the same feature. Continuing the above example, if a third system or third electronic control unit implements "Audio Processing v2," it will respond to the "GetAllEncapsulatedFunctions" with "Audio Processing" and "Audio Processing v2." This will allow the second control unit to selectively load "Audio Processing," but it will not take advantage of additional functions encapsulated in "Audio Processing v2." This is because, as illustrated in FIG. 6, the second control unit 608 consumes the audio processing feature, indicated at 630, but does not consume the audio processing V2 feature.

Figure 9:
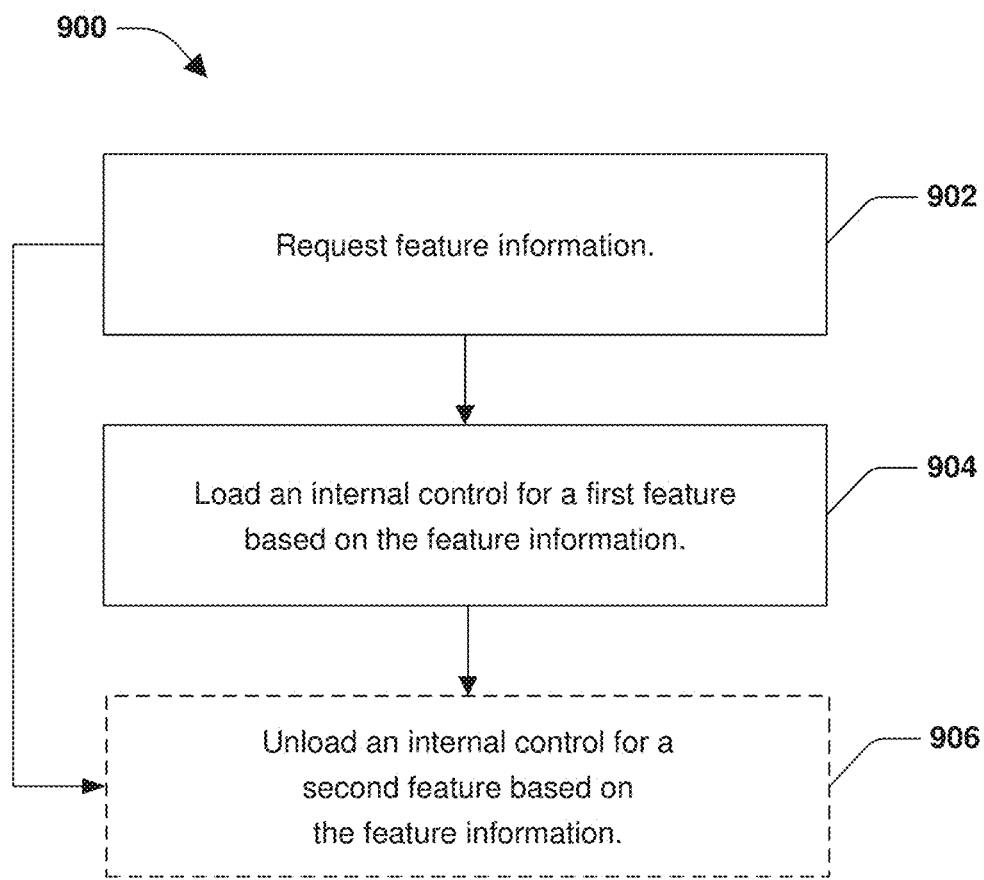
FIG. 9 illustrates an example, non-limiting flow diagram of a method for performing configuration management using encapsulation and discovery, according to an aspect.

FIG. 9 illustrates an example, non-limiting flow diagram of a method 900 for performing configuration management using encapsulation and discovery, according to an aspect. The method 900 may be implemented using any of the systems, such as the system 200 of FIG. 2.

Method 900 starts, at 902, when feature information is requested. For example, feature information may be requested by a first electronic control unit that is attempting to discover features associated with a second electronic control unit and/or additional electronic control units. The feature information may include data related to a set of features implemented by the second electronic control unit (and/or additional electronic control units). The feature information request may be transmitted to the second electronic control unit and/or the additional electronic control units during a startup procedure or at a different time (e.g., periodically, based on detection of a change or upgrade, and so on).

At 904, an internal control may be loaded for a first feature based on the feature information. For example, the second electronic control unit may indicate that three features (e.g., a first feature, a second feature, and a third feature) are implemented by the second electronic control unit. The first electronic control unit may consume the first feature, but not the second feature nor the third feature. In this situation, the first electronic control unit may load an internal control (or multiple internal controls) for the first feature. According to an implementation, loading the internal control may include enabling at least one control for the first feature. Further, enabling at least one control may include loading a driver, loading a remote driver, loading multiple drivers, and/or loading multiple remote drivers for the for the first feature.

Additionally or alternatively, the feature information received by the first electronic control unit may indicate that a second feature is not implemented by the second electronic control unit (although previous versions of the second electronic control unit implemented the second feature). Thus, the first electronic control unit might have control(s) for this feature loaded. In this scenario, at 906, the second feature may be unloaded based on the feature information (or absence of the second feature from the feature information). For example, the first electronic control unit may unload the second feature, which may include deactivating at least one control for the second feature and/or uninstalling one or more drivers.

Figure 10:
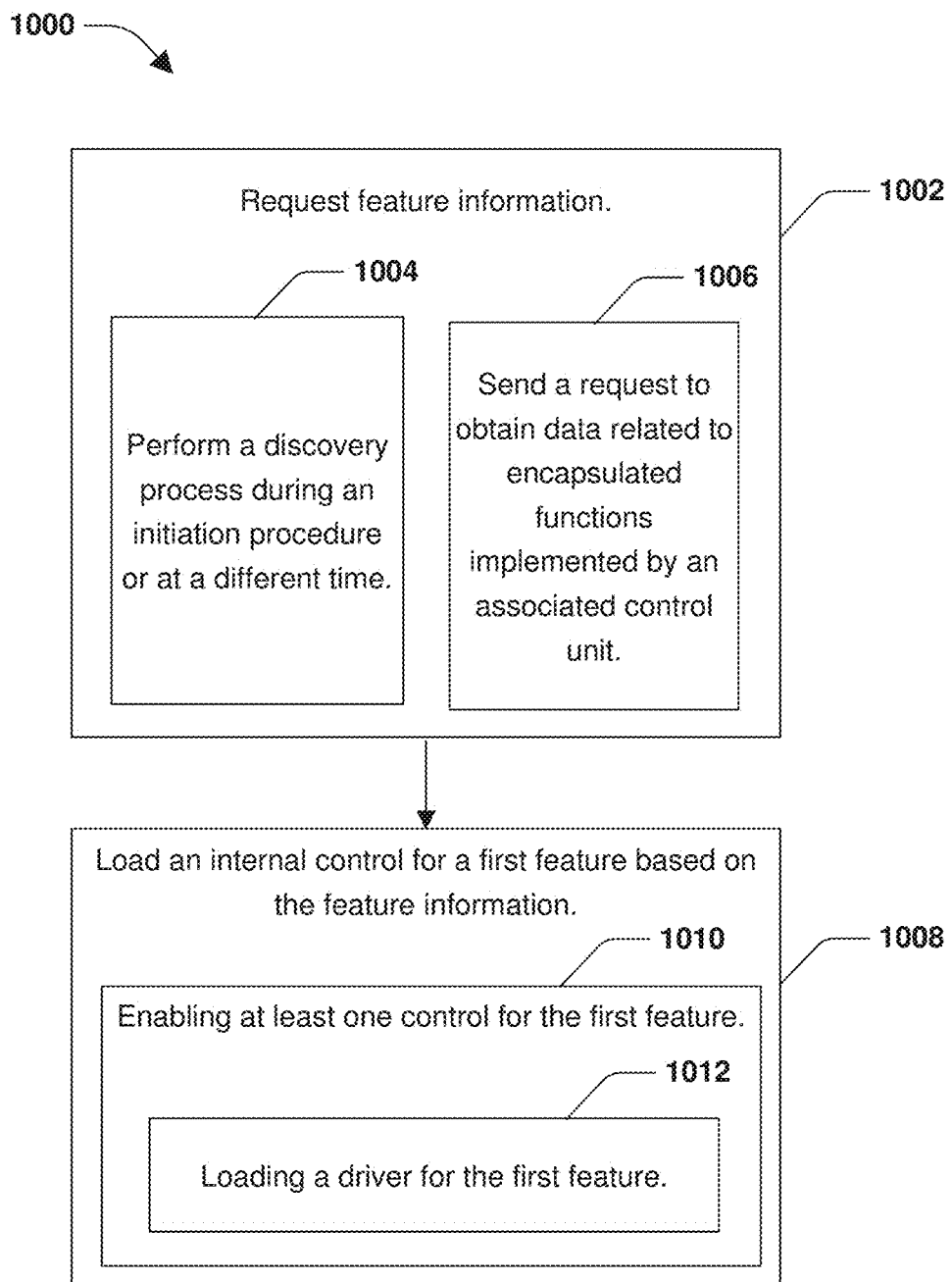
FIG. 10 illustrates an example, non-limiting embodiment of a method for performing resource or feature discovery, according to an aspect.

FIG. 10 illustrates an example, non-limiting embodiment of a method 1000 for performing resource or feature discovery, according to an aspect. The method 1000 may be implemented using any of the systems, such as the system 500 of FIG. 5.

At 1002, a request for feature information is transmitted. For example, the request may be transmitted from a first electronic control unit to a second electronic control unit. According to some implementations, the request may be transmitted to multiple electronic control units at substantially the same time, or at different times. The feature information may include data related to a set of features implemented by the second electronic control unit.

According to an implementation, transmitting the request for feature information may include performing a discovery process, at 1004. The discovery process may be performed during an initiation procedure. Alternatively or additionally, the discovery process may be performed at a different time, such as based on an indication of a change to one or more electronic control units operatively coupled in a distributed communication system. In another example, the discovery process may be performed at defined intervals, periodically, randomly, or based on other intervals.

According to an alternative or additional implementation, transmitting the request for feature information may include sending a request to obtain data, at 1006. The data obtained may relate to encapsulated functions implemented by the second electronic control unit. For example, the second electronic control unit may reply with data related to all features implemented by the second electronic control unit, regardless of whether the features are consumed by the first electronic control unit.

The method 1000 may continue, at 1008, when an internal control for a first feature is loaded on the first electronic control unit. For example, based on the feature information received from the second electronic control unit, a determination may be made that indicates the first electronic control unit may consume one or more features included in the feature information, however, control(s) for that feature are not loaded on the first electronic control unit. Therefore, loading the control may include enabling at least one control for the first feature, at 1010. According to an implementation, loading the first control may include loading a driver (or multiple drivers) for the first feature, at 1012.

Figure 11:
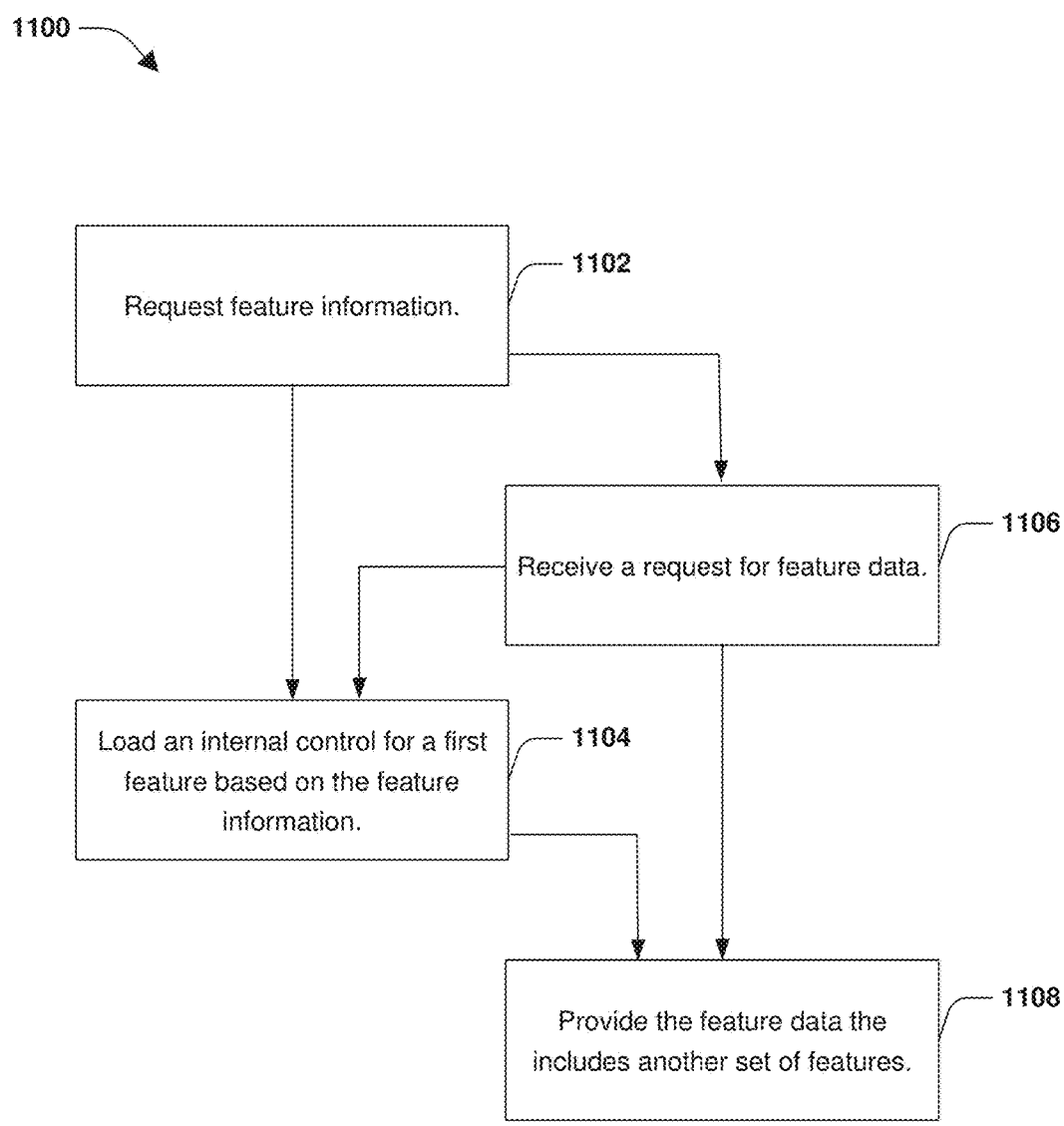
FIG. 11 illustrates an example, non-limiting embodiment of a method for performing resource or feature discovery, according to an aspect.

FIG. 11 illustrates an example, non-limiting embodiment of a method 1100 for performing resource or feature discovery, according to an aspect. The method 1100 may be implemented using any of the systems, such as the system 500 of FIG. 5.

At 1102 a request for feature information may be transmitted from a first electronic control unit to a second electronic control unit. The transmission for feature information may occur during a discovery procedure, for example. Further, the feature information requested may include data related to a set of features implemented by the second electronic control unit. Features of the set of features may include respective behaviors implemented by the second electronic control unit. Further, the features of the set of features may be identified based on a predefined indicator.

Based upon a response received from the second electronic control unit, a control for a first feature included in the feature information may be loaded on the first electronic control unit. For example, when a response is received from the second electronic control unit, a determination may be made as to whether the first feature is consumed and, if so, whether a control for the feature is loaded on the first electronic control unit. If the first feature is not consumed or if the first feature is consumed and a control for the first feature is already loaded, the control is not loaded (nor reloaded).

At substantially the same time (e.g., before, after, concurrently) as the request is sent, at 1102, and/or the control is loaded, at 1104, a request for feature data may be received, at 1106. The request may be received from the second electronic control unit and/or another electronic control unit. In response to the request, at 1108, feature data may be provided to the requesting electronic control unit. The feature data may include another set of features implemented by the first electronic control unit (which may be different from the features of the set of features implemented by the second electronic control unit). In such a manner, a mutual discovery procedure may be performed by the electronic control units that are operatively coupled.

Figure 12:
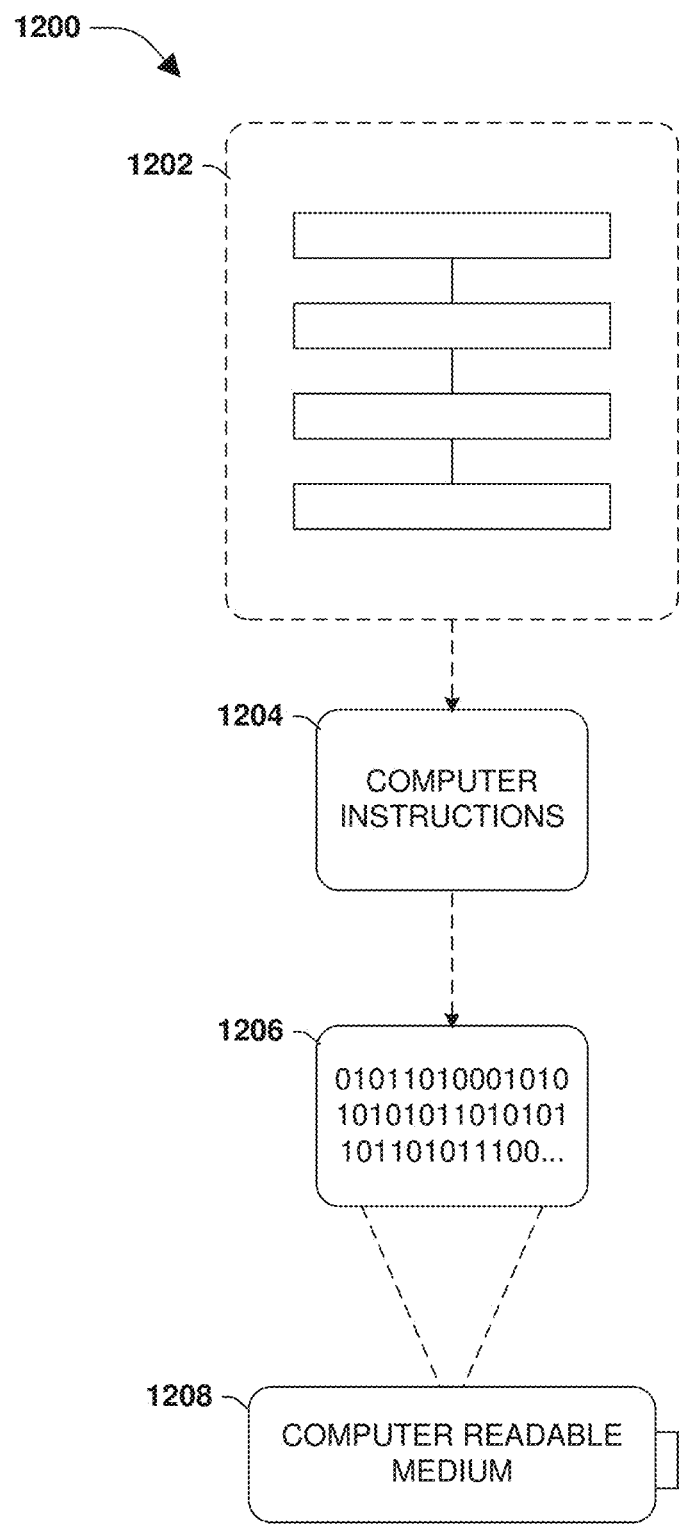
FIG. 12 illustrates an example computer-readable medium or computer-readable device including processor-executable instructions configured to embody one or more of the aspects set forth herein.

Still another embodiment involves a computer-readable medium including processor-executable instructions configured to implement one or more embodiments presented herein. An embodiment of a computer-readable medium or a computer-readable device devised in these ways is illustrated in FIG. 12, wherein an implementation 1200 includes a computer-readable medium 1208, such as a CD-R, DVD-R, flash drive, a platter of a hard disk drive, etc., on which is encoded computer-readable data 1206. This computer-readable data 1206, such as binary data including a plurality of zero's and one's as shown in 1206, in turn includes a set of computer instructions 1204 configured to operate according to one or more of the principles set forth herein. In one such embodiment 1200, the processor-executable computer instructions 1204 may be configured to perform a method 1202, such as the method 1000 of FIG. 10. In another embodiment, the processor-executable instructions 1204 may be configured to implement a system, such as the system 500 of FIG. 5. Many such computer-readable media may be devised by those of ordinary skill in the art that are configured to operate in accordance with the techniques presented herein.

For example, the computer-readable medium 1208 may implement a method that includes requesting, by a first electronic control unit comprising a processor, feature information associated with a second electronic control unit. The feature information may include data related to a set of features implemented by the second electronic control unit. The method may also include loading, by the first electronic control unit, an internal control for a first feature of the set of features based on a determination that the first feature is not loaded on the first electronic control unit.

In an example, requesting the feature information may include performing a discovery process during an initiation procedure. In another example, requesting the feature information may include sending a request to obtain data related to encapsulated functions implemented by the second electronic control unit.

According to another example, loading the internal control may include enabling at least one control for the first feature. Further, to this example, enabling at least one control may include loading a driver for the first feature.

In another example, the method may include unloading, by the first electronic control unit, a second feature based on a determination that the second feature is not included in the set of features implemented by the second electronic control unit and is loaded on the first electronic control unit. Further to this example, the method may include deactivating at least one control for the second feature.

In still another example, the method may include receiving from the second electronic control unit, by the first electronic control unit, a request for feature data associated with the first electronic control unit. Further to this example, the method may include providing to the second electronic control unit, by the first electronic control unit, the feature data that includes another set of features implemented by the first electronic control unit.

According to another example, features of the set of features may include respective behaviors implemented by the second electronic control unit. In yet another example, features of the set of features may be identified based on a predefined indicator.

In another example, the computer-readable medium 1208 may implement a system that includes a processor that executes computer executable components stored in a memory. The computer executable components may include a discovery manager component that may identify a set of features associated with a first electronic control unit. Features included in the set of features comprise encapsulated functions. The computer executable components may also include a unit manager component that may enable, on a second electronic control unit, a first control associated with a first feature included in the set of features based on a determination that the first feature is not enabled on the second electronic control unit. In an example, the features included in the set of features may include respective behaviors associated with operation of a vehicle.

According to another example, the unit manager component may disable, on the second electronic control unit, a second control associated with a second feature not included in the set of features. Further to this example, the unit manager component may uninstall a driver associated with the second feature.

The discovery manager component, according to another example, may identify the set of features during a start-up discovery procedure. According to another example, the discovery manager component may convey feature data that includes another set of features implemented by the second electronic control unit in response to a request for the other set of features from the first electronic control unit.

In still another example, the unit manager component may deploy the second electronic control unit in a maximum dependency status prior to an identification of the set of features associated with the first electronic control unit by the discovery manager component.

Figure 13:
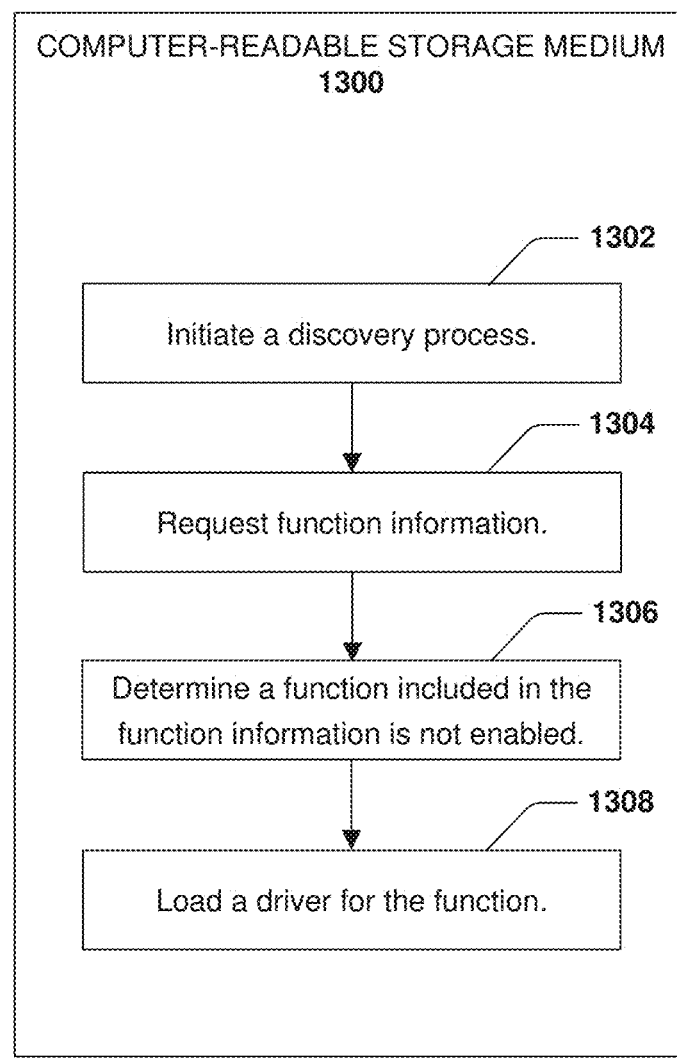
FIG. 13 illustrates a flow diagram of an example, non-limiting embodiment of a set of computer readable instructions for configuration management in accordance with at least some aspects of the subject disclosure.

FIG. 13 illustrates a flow diagram of an example, non-limiting embodiment of a set of computer readable instructions for configuration management in accordance with at least some aspects of the subject disclosure. A computer-readable storage medium 1300 may include computer executable instructions.

At 1302, these instructions may include initiating a discovery process. The discovery process may be initiated during system start up or at a different time. For example, the discovery process may be performed with respect to coupled electronic control units.

At 1304, function information is requested. The function information requested may include a request for the functions implemented by a first electronic control unit during the discovery process.

At 1306, a determination may be made that a function included in the function information is not enabled on a second electronic control unit. The determination may also include determining the second electronic control unit consumes the function implemented by the first electronic control unit.

At 1308, a driver for the function is loaded on the second electronic control unit. At about the same time as the driver is loaded, the second electronic control unit is enabled to consume the feature implemented by the first electronic control unit.

According to an implementation, the instructions may include transmitting, to the first electronic control unit, a set of functions implemented by the second control unit in response to a request for the set of functions. Alternatively or additionally, the instructions may also include determining another function consumed by the second electronic control unit is not included in the function information. Further to this implementation, the instructions may also include unloading, on the second electronic control unit, another driver for the other function.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter may be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 14:
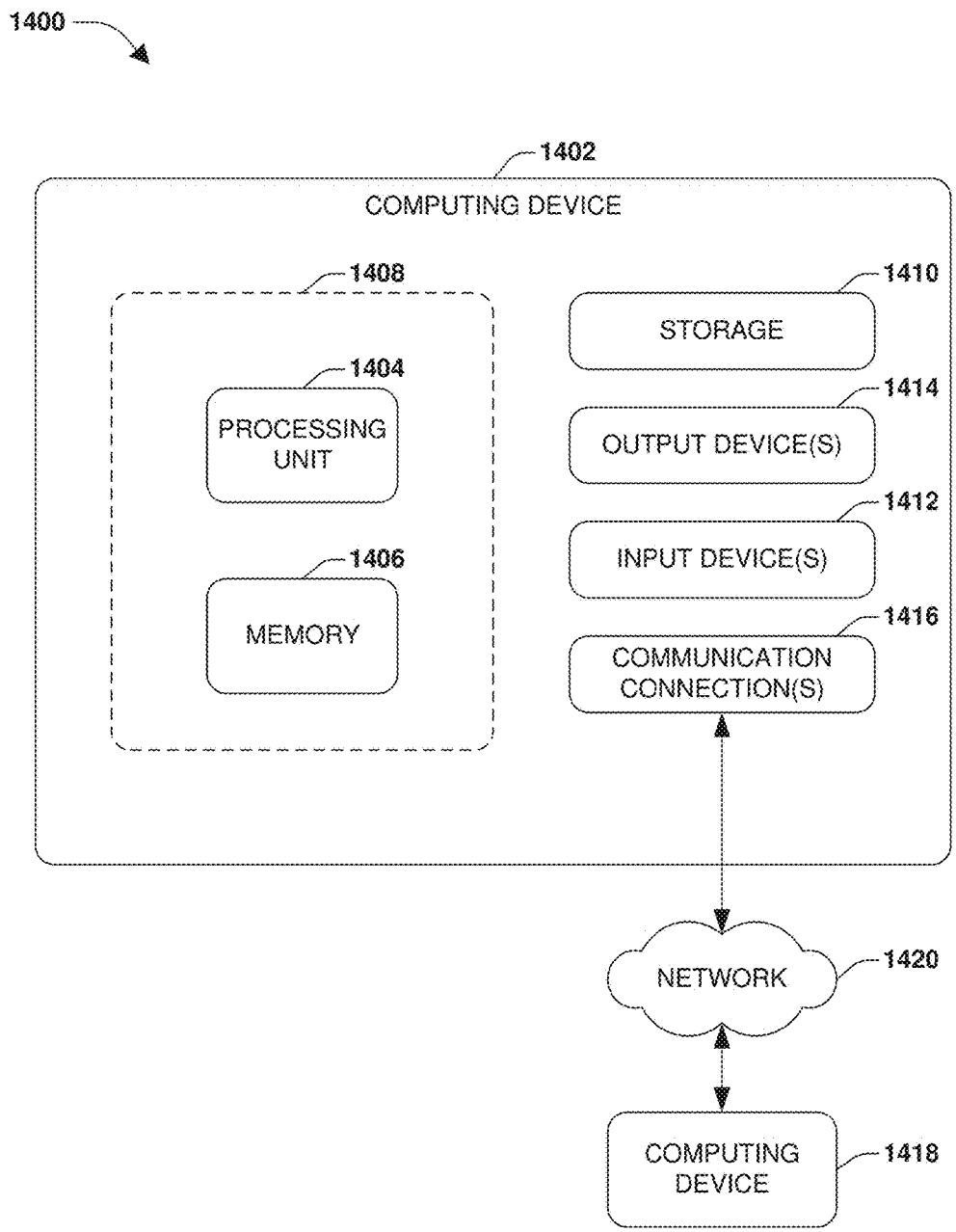
FIG. 14 illustrates an example computing environment where one or more of the aspects set forth herein are implemented, according to one or more embodiments.

FIG. 14 and the following discussion provide a description of a suitable computing environment to implement embodiments of one or more of the aspects set forth herein. The operating environment of FIG. 14 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 14 illustrates a system 1400 that may include a computing device 1402 configured to implement one or more embodiments provided herein. In one configuration, the computing device 1402 may include at least one processing unit 1404 and at least one memory 1406. Depending on the exact configuration and type of computing device, the at least one memory 1406 may be volatile, such as RAM, non-volatile, such as ROM, flash memory, etc., or a combination thereof. This configuration is illustrated in FIG. 14 by dashed line 1408.

In other embodiments, the device 1402 may include additional features or functionality. For example, the device 1402 may include additional storage such as removable storage or non-removable storage, including, but not limited to, magnetic storage, optical storage, etc. Such additional storage is illustrated in FIG. 14 by storage 1410. In one or more embodiments, computer readable instructions to implement one or more embodiments provided herein are in the storage 1410. The storage 1410 may store other computer readable instructions to implement an operating system, an application program, etc. Computer readable instructions may be loaded in the at least one memory 1406 for execution by the at least one processing unit 1404, for example.

Computing devices may include a variety of media, which may include computer-readable storage media or communications media, which two terms are used herein differently from one another as indicated below.

Computer-readable storage media may be any available storage media, which may be accessed by the computer and includes both volatile and nonvolatile media, removable and non-removable media. By way of example, and not limitation, computer-readable storage media may be implemented in connection with any method or technology for storage of information such as computer-readable instructions, program modules, structured data, or unstructured data. Computer-readable storage media may include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which may be used to store desired information. Computer-readable storage media may be accessed by one or more local or remote computing devices (e.g., via access requests, queries or other data retrieval protocols) for a variety of operations with respect to the information stored by the medium.

Communications media typically embody computer-readable instructions, data structures, program modules, or other structured or unstructured data in a data signal such as a modulated data signal (e.g., a carrier wave or other transport mechanism) and includes any information delivery or transport media. The term "modulated data signal" (or signals) refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The device 1402 may include input device(s) 1412 such as keyboard, mouse, pen, voice input device, touch input device, infrared cameras, video input devices, or any other input device. Output device(s) 1414 such as one or more displays, speakers, printers, or any other output device may be included with the device 1402. The input device(s) 1412 and the output device(s) 1414 may be connected to the device 1402 via a wired connection, wireless connection, or any combination thereof. In one or more embodiments, an input device or an output device from another computing device may be used as the input device(s) 1412 and/or the output device(s) 1414 for the device 1402. Further, the device 1402 may include communication connection(s) 1416 to facilitate communications with one or more other devices, illustrated as a computing device 1418 coupled over a network 1420.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising," "comprises," "including," "includes," or the like generally means comprising or including.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A method for configuration management, comprising:
   requesting, by a first electronic control unit comprising a processor, feature information associated with a second electronic control unit, wherein the feature information includes data related to a set of features implemented by the second electronic control unit; and
   loading, by the first electronic control unit, an internal control for a first feature of the set of features based on a determination that at least one control for the first feature is not loaded on the first electronic control unit.

2. The method of claim 1, wherein the requesting comprises performing a discovery process during an initiation procedure.

3. The method of claim 1, wherein the requesting comprises sending a request to obtain data related to encapsulated functions implemented by the second electronic control unit.

4. The method of claim 1, wherein the loading comprises enabling the at least one control for the first feature.

5. The method of claim 4, wherein the enabling the at least one control comprises loading a driver for the first feature.

6. The method of claim 1, further comprising:
   unloading, by the first electronic control unit, at least one control for the second feature based on a determination that the at least one control for the second feature is not included in the set of features implemented by the second electronic control unit and is loaded on the first electronic control unit.

7. The method of claim 6, wherein the unloading comprises deactivating the at least one control for the second feature.

8. The method of claim 1, further comprising:
   receiving from the second electronic control unit, by the first electronic control unit, a request for feature data associated with the first electronic control unit; and
   providing to the second electronic control unit, by the first electronic control unit, the feature data that includes another set of features implemented by the first electronic control unit.

9. The method of claim 1, wherein features of the set of features comprise respective behaviors implemented by the second electronic control unit.

10. The method of claim 1, wherein features of the set of features are identified based on a predefined indicator.

11. A system for configuration management, comprising:
    a processor that executes the following computer executable components stored in a memory:
    a discovery manager component that identifies a set of features associated with a first electronic control unit, wherein features included in the set of features comprise encapsulated functions; and
    a unit manager component that enables, on a second electronic control unit, a first control associated with a first feature included in the set of features based on a determination that at least one control for the first feature is not enabled on the second electronic control unit.

12. The system of claim 11, wherein the features included in the set of features comprise respective behaviors associated with operation of a vehicle.

13. The system of claim 11, wherein the unit manager component disables, on the second electronic control unit, a second control associated with a second feature not included in the set of features.

14. The system of claim 13, wherein the unit manager component uninstalls a driver associated with the second feature.

15. The system of claim 11, wherein the discovery manager component identifies the set of features during a start-up discovery procedure.

16. The system of claim 11, wherein the unit manager component deploys the second electronic control unit in a maximum dependency status prior to an identification of the set of features associated with the first electronic control unit by the discovery manager component.

17. The system of claim 11, wherein the discovery manager component conveys feature data that includes another set of features implemented by the second electronic control unit in response to a request for the other set of features from the first electronic control unit.

18. A computer-readable storage device storing executable instructions that, in response to execution, cause a system comprising a processor to perform operations for configuration management, the operations comprising:
    initiating a discovery process;
    requesting function information that includes functions implemented by a first electronic control unit during the discovery process;
    determining a function included in the function information is not enabled on a second electronic control unit, wherein the second electronic control unit consumes the function implemented by the first electronic control unit; and
    loading, on the second electronic control unit, a driver for the function.

19. The computer-readable storage device of claim 18, further comprising:
    determining another function consumed by the second electronic control unit is not included in the function information; and
    unloading, on the second electronic control unit, another driver for the other function.

20. The computer-readable storage device of claim 18, further comprising:
   transmitting, to the first electronic control unit, a set of functions implemented by the second control unit in response to a request for the set of functions.

* * * * *